United States Patent [19]

Bovino

[11] 4,257,145
[45] Mar. 24, 1981

[54] FOOD BALL FORMING APPARATUS
[76] Inventor: Alessio A. Bovino, P.O. Box 454, Fishkill, N.Y. 12524
[21] Appl. No.: 968,906
[22] Filed: Dec. 13, 1978
[51] Int. Cl.³ .............................................. A22C 7/00
[52] U.S. Cl. ....................................... 17/32; 425/352; 425/355; 425/408; 425/444
[58] Field of Search ................. 17/32, 32 A; 425/408, 425/352, 78, 444, 355

[56] References Cited
U.S. PATENT DOCUMENTS

| | | | |
|---|---|---|---|
| 693,631 | 2/1902 | Tilden et al. | 425/444 |
| 2,393,130 | 1/1946 | Toulmin | 425/78 |
| 3,507,009 | 4/1970 | Comly | 425/78 |
| 3,691,594 | 9/1972 | Klein | 17/32 |
| 3,811,813 | 5/1974 | Taccone | 425/355 |

Primary Examiner—James H. Derrington
Attorney, Agent, or Firm—Curtis Ailes

[57] ABSTRACT

A movable piston having a hemispherical face carries a charge of food out of a fixed cylinder member into a coaxially aligned movable cylinder member and against a hemispherical face of a fixed piston member to form a spherical food ball. The movable piston and the movable cylinder member are then retracted to release the food ball.

2 Claims, 7 Drawing Figures

FOOD BALL FORMING APPARATUS

This invention relates to apparatus for forming charges of a soft plastic food substance into balls. The invention is particularly useful for forming ground meat into meatballs prior to cooking.

Various food substances are formed into balls prior to cooking. There is a particularly strong demand for meatballs formed from ground meat. The formation of the food balls is a time consuming operation, when done by hand. Forming food balls by machine, at high speed, is particularly advantageous in large restaurants and especially in food canning factories. Various prior attempts have been made to devise machines for the production of food balls but such prior attempts have not been particularly satisfactory.

Accordingly, it is one important object of the present invention to provide an improved food ball forming apparatus.

Another object of the invention is to provide an improved food ball forming apparatus which is simple and reliable and inexpensive.

Further objects and advantages of the invention will be apparent from the following description and the accompanying drawings.

In carrying out the invention there is provided an apparatus for forming a food such as ground meat into a ball comprising a first cylinder member having a side port therein, a piston within said first cylinder member having a concave face and having a first position which substantially closes one end of said first cylinder member, the other end of said cylinder member being open, said first cylinder member including a side port positioned between said open end thereof and said concave face of said first piston when said first piston is in said first position, means for charging a quantity of food through said side port into said first cylinder member, a movable cylinder member arranged coaxially with said first cylinder member and having a cylinder bore equal to the cylinder bore of said first cylinder member, said movable cylinder member having a first position against said open end of said first cylinder member so that the cylinder bore of said movable cylinder member essentially provides an extension of the cylinder bore of said first cylinder member, a substantially fixed piston positioned within said movable cylinder member and having a concave piston face in alignment opposite to said concave face of said first piston and axially spaced away from said open end of said first cylinder member, said first piston being operable to move from said first position by advancing through said first cylinder member and into said movable cylinder member to carry the charge of food into contact with said concave end of said fixed cylinder to thereby compress the food between said concave piston faces to form a ball, said first piston then being operable to retract to said first position and said movable cylinder member being movable by axial retraction away from the end of said first cylinder member to expose said concave piston face of said fixed piston to thereby release the food ball for removal.

Figure 1:
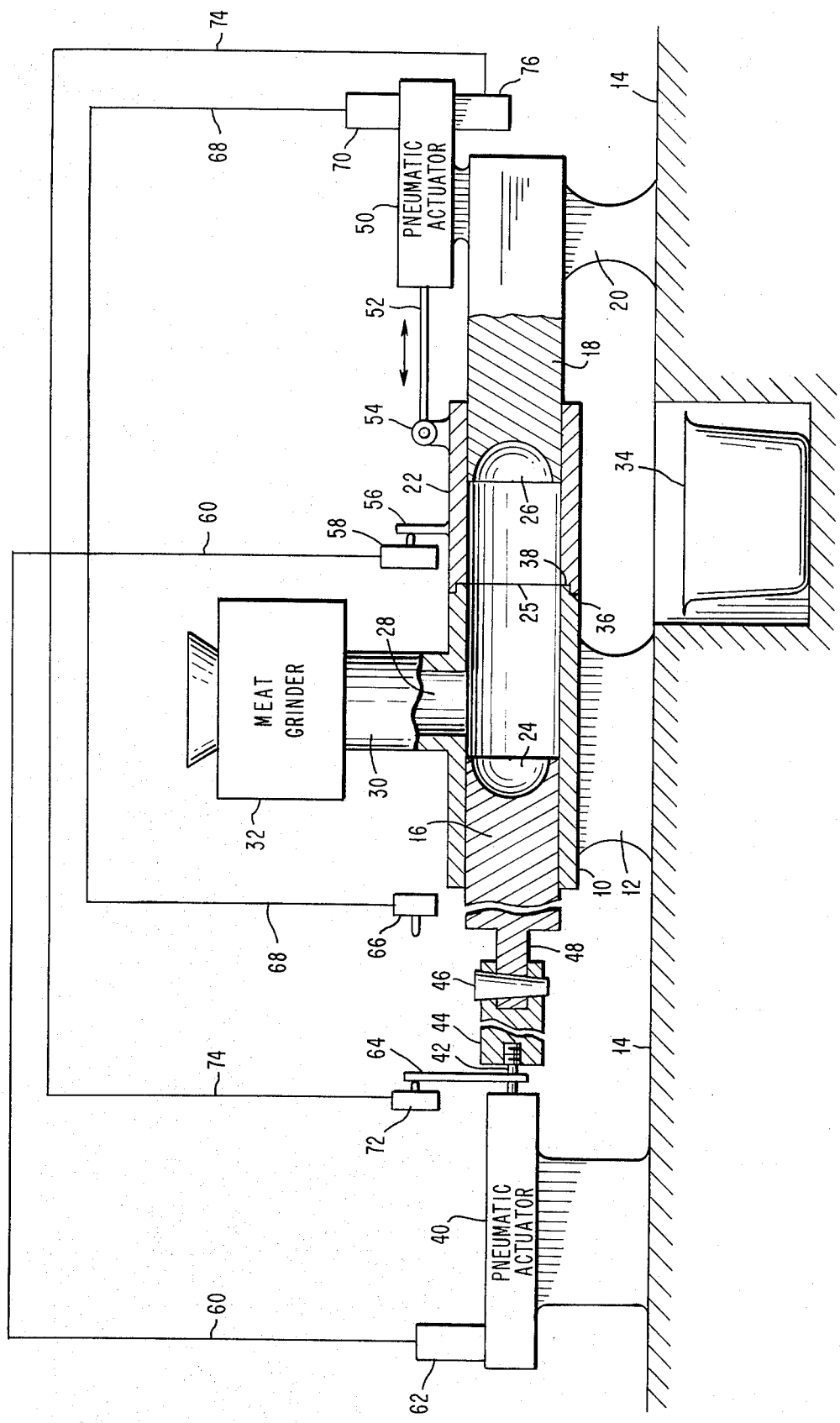
FIG. 1 is a side view of a preferred embodiment of the present invention shown partly in section.

Referring particularly to FIG. 1, there is illustrated a preferred embodiment of an apparatus for forming food balls according to the present invention. This embodiment is shown partly in schematic form, and partly in cross section. The apparatus includes a fixed cylinder 10 supported at 12 upon a supporting surface 14. Within the fixed cylinder member 10 there is arranged a movable piston 16 which is illustrated in what will be characterized as a retracted position.

In axial alignment with the cylinder 10 and the piston 16 there is provided a fixed piston 18, which is supported at 20 upon the supporting structure 14. Mounted upon the fixed piston 18 there is a movable cylinder member 22, which is also arranged coaxially with the first cylinder member 10, and which is illustrated in a first (extended) position against the open end of the fixed cylinder member 10. Thus, the cylinder bore of the movable cylinder member 22 essentially provides an extension of the cylinder bore of the first cylinder member 10. Both the movable piston 16 and the fixed piston 18 have concave faces 24 and 26 which are aligned opposite to one another. Faces 24 and 26 are preferably substantially hemispherical. As illustrated in the drawing, the movable piston 16 substantially closes the left end of the fixed cylinder member 10 when the piston is in the retracted position shown.

The fixed cylinder member 10 includes a side port indicated at 28 which connects with a food channel structure 30 for charging a quantity of food through the side port 28 into the first cylinder 10. Various food charging means may be employed. However, as illustrated in this preferred embodiment, the food charging means consists of a meat grinder 32, which not only grinds the meat, but also provides a force to convey the meat downwardly through the port 28 and into the cylinder 10 in front of the face 24 of the piston 16.

The fixed piston 18 actually supports the movable cylinder member 22, but it may also be characterized as being positioned within the movable cylinder member with the concave piston face thereof being in alignment opposite to the concave face of the first piston 16, and axially spaced away from the open end of the first cylinder member 10.

Figure 2:
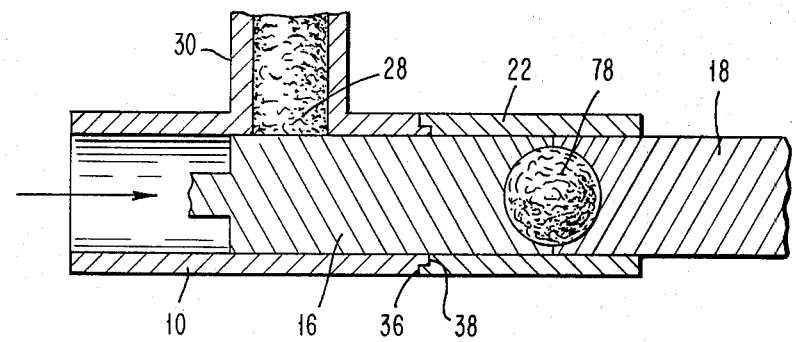
FIG. 2 is a partial detail of the apparatus of FIG. 1 illustrating one step in the operation of the apparatus.

As illustrated graphically in FIG. 2, the first piston 16 is operable to move from the first (retracted) position illustrated in FIG. 1 by advancing (to the right in the drawing) through the first cylinder member 10 and into the movable cylinder member 22 to carry the charge of food (meat) into contact with the concave end face 26 of the fixed cylinder 18 to thereby compress the food between the hemispherical piston faces to form a food ball (78 in FIG. 2). The first piston 16 is then operable to retract back towards the first position, and the movable cylinder member 22 is also movable by axial retraction (to the right in the drawing) away from the end of the first cylinder member 10 to expose the concave piston face 26 of the fixed piston 18 to thereby release the food ball 78 for removal. (See FIG. 3). Such removal may be accomplished merely by gravity force allowing the food ball to fall into a container such as the pan 34 illustrated in FIG. 1. The pan 34, or other container, will typically be larger than illustrated in the drawing.

Continuing with reference to FIG. 1, at the open end of the fixed cylinder member 10, interlocking elements are preferably provided which interlock with corresponding elements on the movable cylinder member 22 to automatically maintain the axial alignment of the cylinder members when the edges of the cylinder members are in mutual engagement. These interlocking elements preferably include an outer lip on one of the cylinder members which extends around the edge of the other one of the members. As illustrated in FIG. 1, specifically, one of the cylinder members, such as member 10 includes an inner lip 38, and the other member includes an outer lip 36, the lips 36 and 38 telescoping together when the cylinder members are engaged to thereby maintain the alignment. While the outer lip 36 is illustrated as a part of the movable cylinder member 22, with the inner lip 38 being a part of the fixed cylinder member 10, the positions of the inner and outer lips may be reversed, if desired.

The reciprocation of the piston 16 and the movable sleeve member 22 may be carried out by various means. A preferred actuating means is a pneumatic actuator, as indicated in the drawing. The pneumatic actuator for piston 16 is illustrated at 40, and includes a reciprocating shaft 42, the end of which is threaded into a coupling shaft 44, which in turn is coupled by means of a removable drive pin 46 to the reduced outer end 48 of the piston 16. The drive pin 46 can be easily removed, as a quick disconnect means, so that the piston 16 can be removed quickly and easily from the cylinder member 10 for cleaning.

A similar linear pneumatic actuator 50 is attached by means of its operating rod 52 and a bracket 54 to the reciprocable cylinder member 22. Both of the pneumatic actuators 40 and 50 are fixed to the support 14.

For additional stability in the actuating mechanism for the piston 16, the coupling shaft 44 is preferably supported within an antifriction pillow block (now shown). In order to simplify the drawing, the coupling shaft 44 and the extension 48 of the piston 16 have been foreshortened, as indicated by the break lines in the drawing for each of these components.

The reciprocal sleeve cylinder member 22 includes a limit switch actuator lever 56 which is operable when the cylinder member 22 is in the extended position, shown in FIG. 1, to close a limit switch 58. This completes an electrical circuit through the associated connection 60 to a control solenoid 62 for the pneumatic actuator 40. Accordingly, if all of the components of the apparatus are in the position shown in FIG. 1, when power is initially applied, operation of the pneumatic actuator 40 is initiated to advance the piston 16, over into the movable cylinder member 22 and against the concave end of the fixed piston 18 to form the food ball. As the operating rod 42 of the pneumatic actuator 40 reaches the limit of its extended position, an associated switch actuator lever 64 carried by the operating rod 42 reaches and closes a limit switch 66 which energizes, through a connection 68, a control solenoid valve 70 for the pneumatic actuator 50. The actuation of the solenoid valve 70 causes the retraction of the pneumatic actuator 50 and the retraction of the movable cylinder 22. Meanwhile, having reached its fully extended position, the pneumatic actuator 40 automatically begins a retraction operation, leading eventually to the fully retracted position of the piston 16. Pneumatic actuator 40 is of an automatic return type such that when it is commanded to extend, it automatically extends, and then retracts after having extended.

The combination of the retraction of cylinder member 22 and the commencement of retraction of the piston 16 releases the food ball for ejection so that it can fall into the collection pan 34. When the retraction of piston 16 is complete, the associated switch operating lever 64 operates a limit switch 72, which is effective through a connection 74 to actuate a second solenoid control valve 76 of the pneumatic actuator 60 which is operable to cause the actuator 60 to again extend the cylinder member 22 to the initial position shown in FIG. 1. In that position, the switch operating lever 56 again actuates the switch 58 to again cause the extension of actuator 40 to extend to piston 16, thus repeating the cycle of operation.

It will be appreciated that, for the sake of simplicity and clarity in the diagram, the serial connections to a power source are not shown for the switches and solenoid valves, but are assumed to be present. It will be understood that the two lines of the power source must be connected respectively to the other terminal (not shown) of each solenoid valve, and the other terminal (not shown) for each associated limit switch.

The pneumatic actuators 40 and 50 may be standard linear actuators. Specific examples of satisfactory actuators are available from Allenair Corporation of 255 East 2nd Street, Mineola, N.Y. 11501. The Allenair model VER-R has been found to be quite satisfactory for the automatic return pneumatic actuator 40. The Allenair model SDS has been found to be quite satisfactory for the pneumatic actuator 50.

Figure 3:
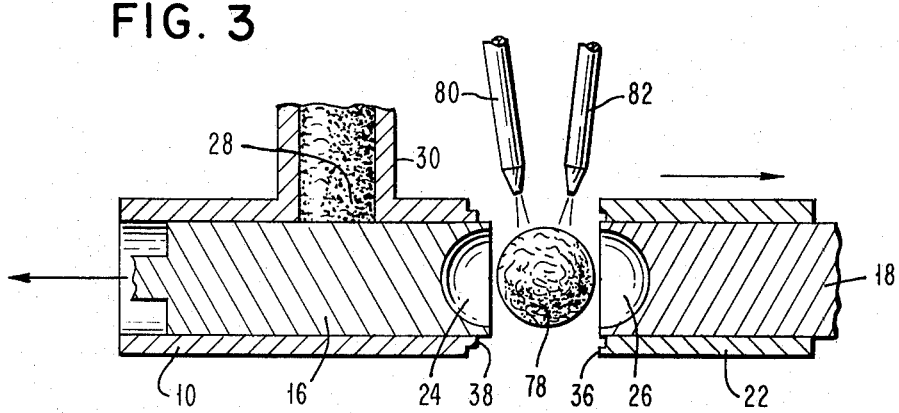
FIG. 3 is a partial detail of the apparatus of FIG. 1 illustrating another step in the operation of the apparatus.

FIGS. 2 and 3, which are partial views of the main components of the apparatus of FIG. 1, graphically illustrate the different stages in the operation of the apparatus. Thus, in FIG. 2, the piston 16 has been advanced, cutting off a portion of food which has entered the bore of cylinder 10 and forming a food ball 78 between the concave faces 24 and 26 of pistons 16 and 18.

In FIG. 3, the movable cylinder member 22 has been retracted fully, and the retraction of the piston 16 has commenced, causing the separation of the concave faces 24 and 26 with the commencement of ejection of the food ball 78. To promote the ejection, there are preferably provided several air jet nozzles 80 and 82 to direct jets of compressed air downwardly against the food ball 78. To simplify the other drawings, the air jet nozzles 80 and 82 are not shown in the other drawing figures.

Figure 4:
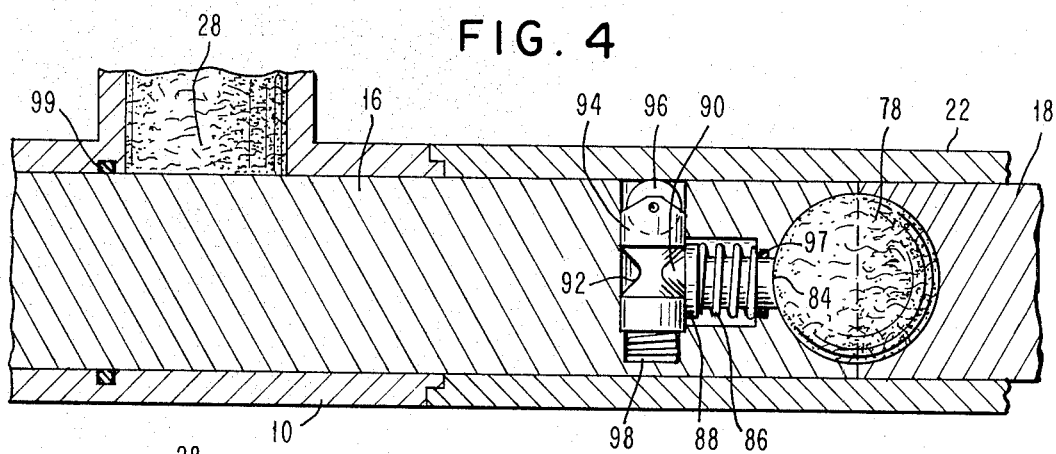
FIGS. 4 and 5 illustrate an alternative feature of the invention providing an ejector plunger in the concave face of one of the pistons of the embodiment of FIG. 1.
Figure 5:
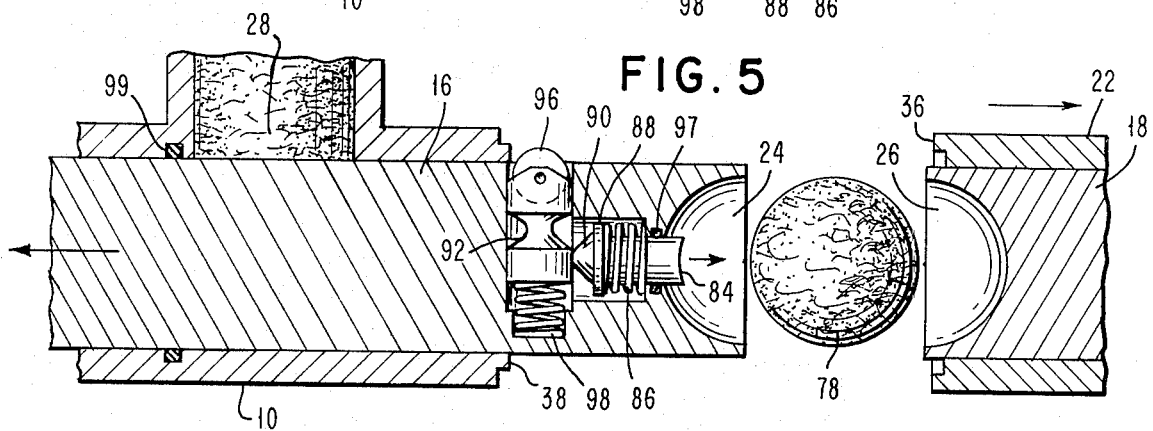

FIGS. 4 and 5 illustrate an alternative feature which may be incorporated into the piston 16. The feature essentially provides an ejector plunger 84 which comprises part of the concave face 24 of the piston 16. The ejector plunger 84 is spring biased to be retracted position shown in FIG. 4 by means of an internal spring 86 operating upon a collar 88 of the plunger. The rear end of the ejector plunger 84 is provided with a rounded cam surface, as indicated particularly at 90 in FIG. 5, which normally nests into a narrow neck portion 92 of an actuator plunger 94, as shown in FIG. 4. The actuator plunger 94 is housed in a transverse bore within the movable piston 16 with an upper cam roller 96 being arranged to extend outward from the piston through the open end of the bore. The actuating plunger 94 is strongly spring biased by means of a spring 98 in the direction which is shown as upward in the drawings, so that the cam roller 96 is confined by and rides along on the inside surface of the cylinder members 10, 22.

Upon the completion of the advance stroke of piston 16, as illustrated in FIG. 2, and as also illustrated in FIG. 4, the cylinder member 22 begins to retract prior to substantial retraction by the piston 16. This releases the roller 96 of the actuating plunger 94 so that it pops out of its bore, as illustrated in FIG. 5. This operation overcomes the force of spring 86 and causes the ejector plunger 84 to advance to loosen the food ball from the face 24 of piston 16. As the piston 16 continues to retract towards the position illustrated in FIG. 1, the cam roller 96 is forced to retract back into the bore within piston 16 by the edge portion of the cylinder 10. This causes the actuating plunger to be again confined, as illustrated in FIG. 4, and the ejector plunger 84 is again caused to retract by the spring 86 to the position illustrated in FIG. 4. It will be appreciated that the actuator plunger spring 98 must be more powerful than the ejector plunger return spring 86. FIGS. 4 and 5 also illustrate that "O-ring" seals may be provided at 97 between the ejector plunger 84 and its bore, and at 99 between piston 16 and cylinder 22 to prevent the passage of food past the seals.

Figure 6:
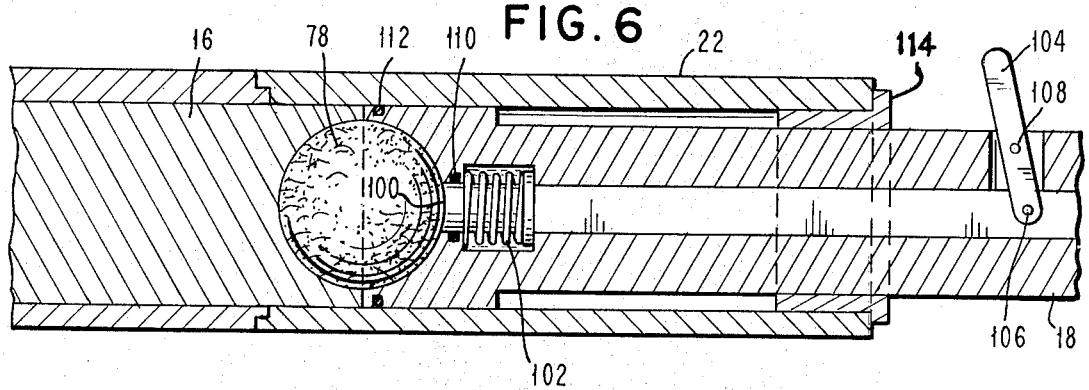
FIGS. 6 and 7 illustrate another alternative feature in which an ejector plunger is provided in the concave face of the other piston.
Figure 7:
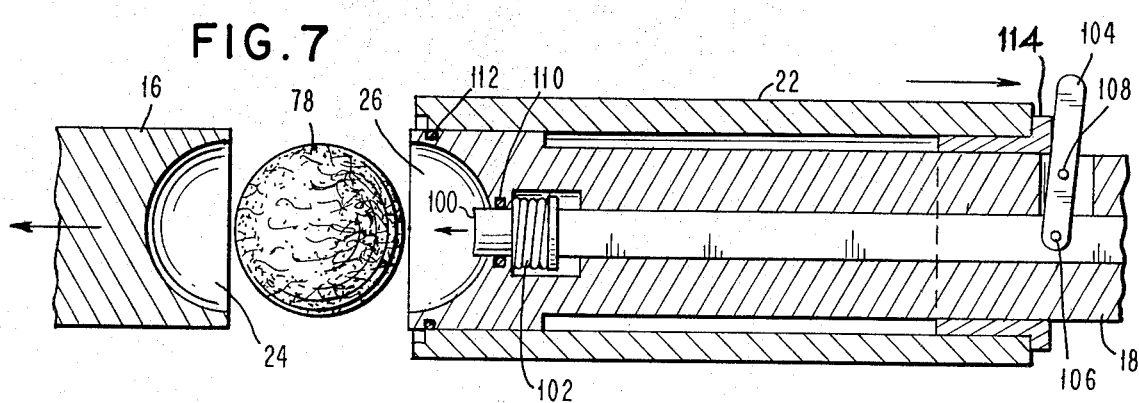

FIGS. 6 and 7 illustrate another alternative feature in which an ejector plunger 100 may be provided in the concave face 26 of the fixed piston 18. The plunger 100 is provided with a retraction spring 102, and an operating lever 104 which is pivotally attached to the plunger 100, by means of a pivot 106. Lever 104 is provided with a fulcrum attachment within the piston 18 by means of a pin 108.

When the cylinder member 22 is in the advanced position of FIG. 1, also illustrated in FIG. 6, the retraction spring 102 is effective to keep the ejector plunger 100 retracted fully. However, when the cylinder member 22 is retracted after formation of a food ball, as illustrated in FIG. 3, and as also illustrated in FIG. 7, the rear edge (at the right in the drawing) of the cylinder member 22 engages the upper end of lever 104, as illustrated in FIG. 7, causing a clockwise rotation of that lever with a consequent extension of the ejector plunger 100 to loosen the food ball from the face 26 of piston 18. As illustrated in FIGS. 6 and 7, "O-ring" seals are preferably provided at 110 between ejector pin 100 and its bore, and at 112 between piston 18 and cylinder 22 to prevent the entry of food beyond the seals.

Also, to reduce drag of the cylinder 22 upon piston 18, a plastic sleeve bearing may be provided at 114 inside the right end of cylinder 22.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. Apparatus for forming a food such as ground meat into a ball comprising
   a first cylinder member having a side port therein,
   a piston within said first cylinder member having a concave face and having a first position which substantially closes one end of said first cylinder member,
   the other end of said cylinder member being open,
   said first cylinder member side port being positioned between said open end thereof and said concave face of said first piston when said first piston is in said first position,
   means for charging a quantity of food through said side port into said first cylinder member,
   a movable cylinder member arranged coaxially with said first cylinder member and having a cylinder bore equal to the cylinder bore of said first cylinder member,
   said movable cylinder member having a first position against said open end of said first cylinder member so that the cylinder bore of said movable cylinder member essentially provides an extension of the cylinder bore of said first cylinder member,
   a substantially fixed piston positioned within said movable cylinder member and having a concave piston face in alignment opposite to said concave face of said first piston and axially spaced away from said open end of said first cylinder member,
   said first piston being operable to move from said first position by advancing through said first cylinder member and into said movable cylinder member to carry the charge of food into contact with said concave end of said fixed piston to thereby compress the food between said concave piston faces to form a ball,
   said first piston then being operable to retract to said first position and
   said movable cylinder member being movable by axial retraction away from the end of said first cylinder member to expose said concave piston face of said fixed piston to thereby release the food ball for removal,
   a separate ejector plunger provided in the concave face of each of said pistons and operable as the pistons are separated to advance axially from the concave face of the associated piston to push the food ball away from that face for ejecting the food ball from either piston to which the food ball may adhere,
   the ejector plunger in said movable piston being spring biased to the retracted position,
   an actuator plunger for actuating said last mentioned ejector plunger and extending crosswise within a bore within said movable piston,
   said actuating plunger being spring biased to move transversely within said movable piston against the inside surface of said cylinder members in which said movable piston is reciprocable,
   said actuating plunger being released for transverse movement thereof as said movable piston is being retracted from the advanced position within said movable cylinder member and as said movable cylinder member is retracted from a position surrounding said movable piston,
   said actuating plunger including a cam surface operable on the end of said associated ejector plunger to cause said ejector plunger to be extended whenever said actuating plunger is extended,
   said actuating plunger being operable upon the retraction of said movable piston by engagement with the edge and inner surface of said first cylinder to retract and causing the retraction of said associated ejector plunger as well.

2. Apparatus for forming a food such as ground meat into a ball comprising
   a first cylinder member having a side port therein, a piston within said first cylinder member having a concave face and having a first position which substantially closes one end of said first cylinder member, the other end of said cylinder member being open, said first cylinder member side port being positioned between said open end thereof and said concave face of said first piston when said first piston is in said first position, means for charging a quantity of food through said side port into said first cylinder member, a movable cylinder member arranged coaxially with said first cylinder member and having a cylinder bore equal to the cylinder bore of said first cylinder member, said movable cylinder member having a first position against said open end of said first cylinder member so that the cylinder bore of said movable cylinder member essentially provides an extension of the cylinder bore of said first cylinder member, a substantially fixed piston positioned within said movable cylinder member and having a concave piston face in alignment opposite to said concave face of said first piston and axially spaced away from said open end of said first cylinder member, said first piston being operable to move from said first position by advancing through said first cylinder member and into said movable cylinder member to carry the charge of food into contact with said concave end of said fixed piston to thereby compress the food between said concave piston faces to form a ball, said first piston then being operable to retract to said first position and said movable cylinder member being movable by axial retraction away from the end of said first cylinder member to expose said concave piston face of said fixed piston to thereby release the food ball for removal, a separate ejector plunger provided in the concave face of each of said pistons and operable as the pistons are separated to advance axially from the concave face of the associated piston to push the food ball away from that face for ejecting the food ball from either piston to which the food ball may adhere, and wherein there is provided within said fixed piston a pivoted lever engaging the inner end of said ejector plunger of said fixed piston, said lever extending outside said fixed piston and being arranged to be engaged by said movable cylinder member as said movable cylinder member is retracted to thereby cause said actuating lever to be rotated and to thus cause advancement of said associated ejector plunger.

* * * * *

UNITED STATES PATENT AND TRADEMARK OFFICE
CERTIFICATE OF CORRECTION

PATENT NO. : 4,257,145
DATED : March 24, 1981
INVENTOR(S) : Alessio A. Bovino

It is certified that error appears in the above—identified patent and that said Letters Patent is hereby corrected as shown below:

Column 2, line 42, "hot" should read --not--.

Column 4, line 18, after "extend" cancel "to";

line 27, "for" should read --of--;

line 57, "be" should read --the--.

Signed and Sealed this

Sixteenth Day of June 1981

[SEAL]

Attest:

RENE D. TEGTMEYER

Attesting Officer  Acting Commissioner of Patents and Trademarks